United States Patent [19]

Draper

[11] Patent Number: 4,560,602
[45] Date of Patent: Dec. 24, 1985

[54] VEHICLE INSTRUMENT PANEL APPLIQUE WITH GLOVE BOX

[75] Inventor: David L. Draper, Hamburg, Mich.

[73] Assignee: Cars & Concepts, Inc., Brighton, Mich.

[21] Appl. No.: 669,465

[22] Filed: Nov. 8, 1984

[51] Int. Cl.$^4$ .............................................. B44C 5/04
[52] U.S. Cl. ...................................... 428/79; 428/31; 428/537.1
[58] Field of Search ................ 428/31, 919, 79, 537.1

[56] References Cited

U.S. PATENT DOCUMENTS

| | | | |
|---|---|---|---|
| 3,423,276 | 1/1969 | Eckenroth | 428/31 X |
| 4,280,226 | 7/1981 | Jenkins | 428/31 X |
| 4,365,280 | 12/1982 | Crosetti et al. | 428/919 X |
| 4,391,053 | 7/1983 | Anthony | 40/154 X |

FOREIGN PATENT DOCUMENTS 2070539 9/1981 United Kingdom ................ 428/31

Primary Examiner—Henry F. Epstein
Attorney, Agent, or Firm—Brooks & Kushman

[57] ABSTRACT

An applique (10) for a vehicle instrument panel (12) is disclosed as including a cover embodied by a cover member (26) with openings (34) for viewing gauges of the instrument panel at the driver side and with a glove box (36) provided at the passenger side. An opening (38) in the cover member (26), a door (40), and a molded plastic receptacle member (42) cooperate to provide the glove box which also preferably includes a latch (66) and a check assembly (74). Wood veneer (32) is preferably secured to the outer side of the cover member (26) and to the door (40) to provide an aesthetically appealing appearance.

9 Claims, 3 Drawing Figures

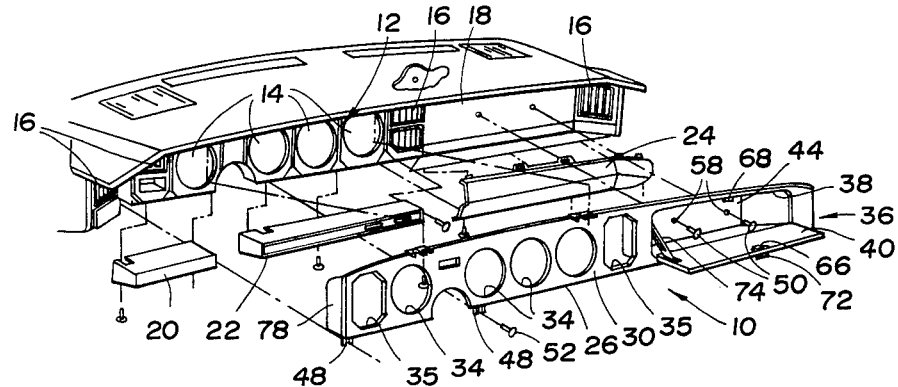
Fig. 1
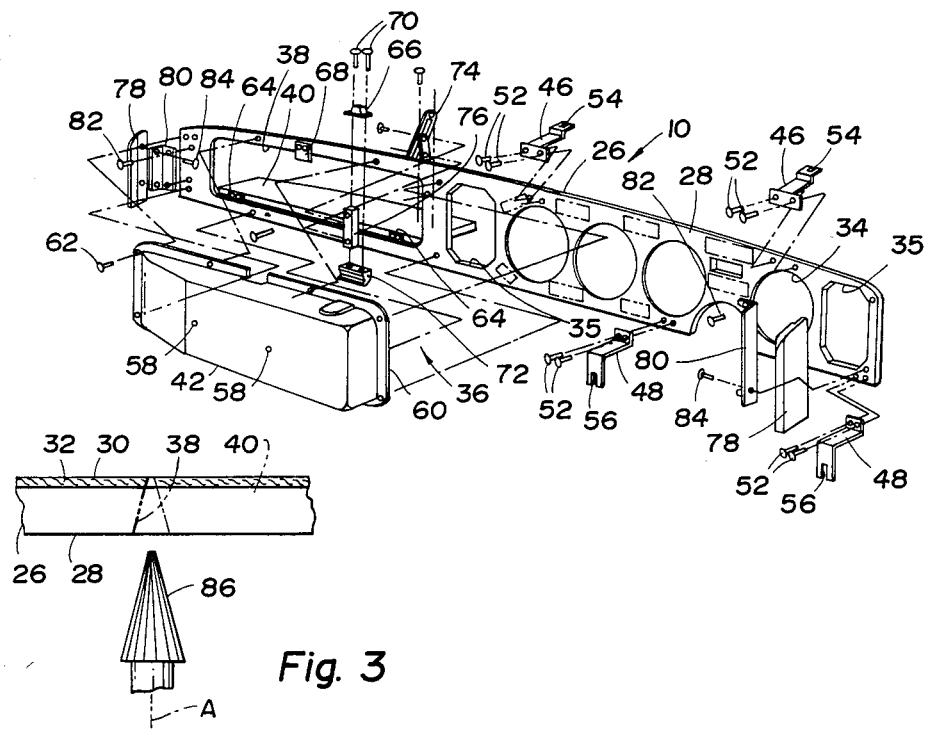
Fig. 2
Fig. 3

VEHICLE INSTRUMENT PANEL APPLIQUE WITH GLOVE BOX

TECHNICAL FIELD

This invention relates to an applique for covering a vehicle instrument panel

BACKGROUND ART

Vehicle instrument panel appliques have previously been utilized to give vehicle instrument panels an aesthetically appealing appearance, most often by using wood veneer that is not normally available on domestically manufactured vehicles. Usually such appliques are relatively small and only cover a portion of the instrument panel.

Certain domestically manufactured vehicles are made without any glove box on the passenger side of the instrument panel. Sometimes a soft pouch is installed to replace the glove box. However, such pouches do not conceal articles contained therein in the same manner as glove boxes since the size of the pouch changes when it is filled and such change can be observed from outside the vehicle. Also, removal of selected articles from such pouches is not as convenient as is the case with glove boxes.

DISCLOSURE OF INVENTION

An object of the present invention is to provide an improved applique for completely covering a vehicle instrument panel while providing a glove box at its passenger side.

In carrying out the above object, the applique is designed for use with a vehicle instrument panel having a driver side with gauges and a passenger side without any glove box. The applique includes a cover having driver and passenger portions respectively located at the driver and passenger sides of the instrument panel. Each cover portion has an inner side that faces the instrument panel upon mounting thereon and also has an outer side that faces the vehicle occupant compartment and is preferably provided with wood veneer to provide an aesthetically appealing appearance.

The driver portion of the cover has openings through which the gauges of the instrument panel can be viewed, and the passenger portion of the cover includes a glove box at the passenger end of the instrument panel. This glove box includes an opening in the passenger portion of the cover and also includes a door mounted for movement between open and closed positions with respect to the glove box opening. The glove box further includes a receptacle panel on the inner side of the passenger portion of the cover in alignment with the opening thereof to define a glove box receptacle that is opened and closed by the door. Brackets and threaded screws are also disclosed for providing a preferred means of mounting the cover on the instrument panel.

In the disclosed construction of the applique, the cover is embodied by an elongated cover member that extends between the driver and passenger sides of the instrument panel and has driver and passenger ends that respectively define the driver and passenger portions of the cover. However, in certain vehicles, the driver and passenger portions of the cover are best made separate from each other such as when the locations of the driver and passenger sides of the instrument panel do not permit the use of a single planar cover member.

The receptacle panel of the glove box is preferably molded from plastic separate from the cover member. Threaded screws provide a preferred means for securing the receptacle panel to the inner side of the cover member. A hinge pivotally mounts the glove box door on the cover member for movement between open and closed positions with respect to the receptacle defined by the receptacle panel. A releasable latch releasably secures the glove box door in the closed position while selectively permitting movement thereof to the open position. A check extends between the elongated cover member and the door to position the door in a horizontal orientation in the open position in order to permit the glove box door to support beverage containers.

As disclosed, the applique also includes end panels mounted on both the driver and passenger ends of the elongated cover member. These end panels extend in a generally perpendicular relationship to the cover member and are disclosed as being secured by brackets and threaded fasteners although it would also be possible to utilize other means of securement or to manufacture the end panels unitary with the cover member.

The securement of the applique to the instrument panel is disclosed as being provided by brackets that are secured to the inner side of the cover member and also secured to the instrument panel during the mounting. In addition, connectors are provided extending between the receptacle panel and the instrument panel to cooperate with the brackets in mounting the applique.

As previously mentioned, the outer side of the elongated cover member preferably includes wood veneer for providing an aesthetically appealing appearance to the applique. The opening for the glove box is cut by a pointed milling cutter in a manner which permits the removed portion to function as the door without an excessive gap at the front space where the veneer is located. As such, any grain pattern of the veneer is continuous between the cover member and the door to further enhance the appearance of the applique.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a perspective view of a vehicle instrument panel and the exposed side of an applique that is constructed in accordance with the present invention to completely cover the instrument panel;

FIG. 2 is an exploded perspective view of the applique looking at the side thereof which faces the instrument panel in the mounted relationship; and FIG. 3 is a view which illustrates the manner in which a door opening is cut in a cover member of the applique to provide a glove box door opening while permitting the cut out portion to be utilized as the door.

BEST MODE FOR CARRYING OUT THE INVENTION

With reference to FIG. 1 of the drawings, an applique constructed in accordance with the present invention is indicated generally by 10 and is designed for use with a vehicle instrument panel 12. At its driver side, the instrument panel 12 includes a plurality of gauges 14 in a conventional manner. Air outlets 16 are also provided for heating and air conditioning along the instrument panel in the normal fashion. Instrument panel 12 is of the type which does not include any glove box at its passenger side. Rather, the instrument panel 12 merely includes a panel 18 that faces rearwardly. If any soft pouch is provided on the panel 18, the pouch is removed prior to installation of the applique 10 as is hereinafter more fully described. Although not necessary in most installations, trim panels 20, 22, and 24 were removed from the instrument panel for installation of the applique 10.

With combined reference to FIGS. 1 and 2, the applique 10 includes a cover embodied by an elongated cover member 26 that has a planar construction and is adapted to extend between the driver and passenger sides of the instrument panel 12. As shown in FIG. 2, the cover member 26 has an inner side 28 that faces the instrument panel 12 upon mounting thereon. An outer side 30 of cover member 26 faces the vehicle occupant compartment and, as illustrated in FIG. 3, preferably includes wood veneer 32 such that the mounted applique provides the instrument panel with an aesthetically appealing appearance.

Cover member 26 has a driver end that embodies a driver portion of the applique cover and includes openings 34 through which the gauges 14 can be viewed as well as including openings 35 for the air outlets 16. The cover member 26 also has a passenger end that embodies a passenger portion of the applique cover and includes a glove box that is generally indicated by 36.

As illustrated in both FIGS. 1 and 2, glove box 36 includes an opening 38 in the passenger end of the cover member 26 and also includes a door 40 mounted for movement between open and closed positions with respect to the opening. A receptacle panel 42 of the glove box 36 is located on the inner side of the passenger end of the cover member 26 in alignment with the opening 38 thereof to define a glove box receptacle which is indicated by 44 in FIG. 1.

Upper and lower pairs of brackets 46 and 48 illustrated in FIG. 2 at the driver end, and a pair of connectors 50 illustrated in FIG. 1 at the passenger end cooperate to provide a preferred means for securing the applique 10 to the instrument panel 12. However, it should be understood that other types of securement and modifications of the brackets and connectors can be utilized in addition to the preferred construction described in detail below.

Each of the brackets 46 and 48 illustrated in FIG. 2 has a flange secured by a pair of threaded screws 52 to the inner side 28 of the cover member at the locations indicated. Slots 54 in flanges of the upper brackets 46 and slots 56 in flanges of the lower brackets 48 provide for securement of the brackets and hence the cover member 26 of the applique to the instrument panel by use of screws or bolts, as may be required, while permitting adjustment to accommodate for manufacturing tolerances. Connectors 50 illustrated in FIG. 1 are preferably embodied by threaded screws or bolts and are adapted to extend through holes 58 in the receptacle panel 42 and into the panel 18 at the passenger side of the instrument panel 12.

Receptacle panel 42 is illustrated in FIG. 2 and is preferably molded from plastic separate from the cover member 26. As illustrated, the plastic receptacle 42 has a peripheral flange 60 that engages the inner side 28 of the cover member 26 about the opening 38. Threaded screws 62 provide a preferred means for securing the flange 60 to the cover member 26 about the opening 38 in order to position the receptacle panel 42 for defining the receptacle as identified at 44 in FIG. 1.

Glove box door 40 has a lower edge that is mounted by a hinge 64 on the lower edge of the opening 38 in order to support the door for movement between the open position illustrated and a closed position where the door closes the opening 38 to the receptacle 44. At its upper edge, the door 40 includes a releasable latch 66 that is engageable with a keeper 68 mounted on the inner side of the cover member 26 at the upper edge of the opening 38. Latch 66 is secured to the inner side of the door 40 by a pair of screws 70 that also secure a handle 72 to the outer side of the door. If desired, the latch may also incorporate a key lock for locking the glove box.

A check assembly 74 extends between the door 40 as shown in FIG. 1 and a block 76 that is suitably mounted on the inner side 28 of the cover member 26 adjacent the inboard side of the opening 38. The check assembly allows movement of the door between the open and closed positions and, in the open position, positions the door in a horizontal orientation so as to permit beverage containers or other articles to be placed on the door in a convenient manner. In this connection, it is also possible to provide shallow openings on the inner side of the door for positioning beverage containers.

Applique 10 is also illustrated as including a pair of end panels 78 at the driver and passenger ends of the cover member 26. Each end panel 78 like the cover member 26 also preferably has an outer side that is covered by wood veneer to provide an aesthetically appealing appearance. As illustrated, brackets 80 are secured by screws 82 to the inner side 28 of the cover member 26 at its opposite ends and are also respectively secured to the associated end panels 78 by screws 84 such that the end panels extend generally perpendicular to the cover member 26. It is also possible to secure the end panel 78 in other ways such as by adhesives or other types of connections. Upon mounting of the applique on the instrument panel 12 illustrated, the end panels 78 are located just inboard from the two outer air outlets 16 at the opposite ends of the instrument panel. However, in most installations, the cover member 26 of the applique will completely cover the instrument panel from one side to the other for its entire width.

With reference to FIG. 3, the cover member 26 like the end panels previously described may be made from suitable wood particle board or molded plastic, etc. and has the wood veneer 32 adhesively secured to its outer side 30 to provide the aesthetically appealing appearance of the applique. The glove box opening 38 and the door 40 of the applique are preferably manufactured by use of a pointed milling cutter 86 rotatable about an axis A such that the opening has a slightly larger size at its inner side 28 than at its outer side 30. By cutting the opening and the door in this fashion, a very small spacing is left at the outer surface where the veneer 32 is located and the door 40 can be easily formed from the cut out portion of the cover member as the opening 38 is generated. Upon mounting, the door 40 also has wood grain which provides a continuous matching appearance with the adjacent wood grain from the rest of the cover member in an aesthetically appealing manner.

While the best mode for carrying out the invention has been described, those familiar with the art to which this invention relates will recognize various alternative designs and embodiments for practicing the invention as defined by the following claims.

What is claimed is;

1. An applique for a vehicle instrument panel having a driver side with gauges and a passenger side without any glove box, said applique comprising: a cover including driver and passenger portions respectively located at the driver and passenger sides of the instrument panel; each cover portion having an inner side that faces the instrument panel upon mounting thereon and also having an outer side that faces the vehicle occupant compartment; openings in the driver portion of the cover through which the gauges of the instrument panel can be viewed; a glove box on the passenger portion of the cover; said glove box including an opening in the passenger portion of the cover and also including a door mounted for movement between open and closed positions with respect to the glove box opening; the glove box further including a receptacle panel on the inner side of the passenger portion of the cover in alignment with the opening thereof to define a glove box receptacle; and means for mounting the driver and passenger portions of the cover on the instrument panel.

2. An applique as in claim 1 wherein the cover comprises an elongated cover member that extends between the driver and passenger sides of the instrument panel and has driver and passenger ends that respectively embody the driver and passenger portions of the cover.

3. An applique as in claim 2 wherein the receptacle panel is molded from plastic separate from the cover member; means for securing the receptacle panel to the inner side of the cover member; a hinge that pivotally mounts the glove box door on the cover member for movement between the open and closed positions; and a releasable latch for releasably securing the glove box door in the closed position.

4. An applique as in claim 3 further including a check assembly that extends between the elongated cover member and the door to position the door in a horizontal orientation in the open position.

5. An applique as in claim 2 further comprising end panels mounted on both the driver and passenger ends of the elongated cover member and extending in a generally perpendicular relationship to the cover member.

6. An applique as in claim 2 wherein the mounting means comprises a plurality of brackets that are secured to the inner side of the cover member and also secured to the instrument panel to mount the applique; and the mounting means also including connectors that extend between the receptacle panel and the instrument panel to cooperate with the brackets in mounting the applique.

7. An applique as in any preceding claim, in which the outer side of both the driver and passenger portions of the cover includes wood veneer for providing an aesthetically appealing appearance.

8. An applique for a vehicle instrument panel having a driver side with gauges and a passenger side without any glove box, said applique comprising: an elongated cover member adapted to extend between the driver and passenger sides of the instrument panel; the cover member having an inner side that faces the instrument panel upon mounting thereon and also having an outer side that faces the vehicle occupant compartment; the cover member having driver and passenger ends; openings in the driver end of the cover member through which the gauges of the instrument panel can be viewed; a glove box on the passenger end of the cover member; said glove box including an opening in the passenger end of the cover member and also including a door; a hinge that pivotally mounts the glove box door on the cover member for movement between the open and closed positions with respect to the opening; the glove box further including a molded plastic receptacle panel secured to the inner side of the passenger end of the cover member in alignment with the opening thereof to define a glove box receptacle; a releasable latch for releasably securing the glove box door in the closed position; a check assembly that extends between the elongated cover member and the door to position the door in a horizontal orientation in the open position; and means for mounting the cover member on the instrument panel.

9. An applique for a vehicle instrument panel having a driver side with gauges and a passenger side without any glove box, said applique comprising: an elongated cover member adapted to extend between the driver and passenger sides of the instrument panel; the cover member having an inner side that faces the instrument panel upon mounting thereon and also having an outer side that faces the vehicle occupant compartment; wood veneer on the outer surface of the cover member to provide an aesthetically appealing appearance; the cover member having driver and passenger ends; openings in the driver end of the cover member through which the gauges of the instrument panel can be viewed; a glove box on the passenger end of the cover member; said glove box including an opening in the passenger end of the cover member; a door; a hinge that mounts the door on the cover member for movement between open and closed positions with respect to the opening; a releasable latch for releasably securing the glove box door in the closed position; the glove box further including a molded plastic receptacle panel secured to the inner side of the passenger end of the cover member in alignment with the opening thereof to define a glove box receptacle; and means for mounting the cover member on the instrument panel.

* * * * *